US010013643B2

(12) United States Patent
Yellapragada et al.

(10) Patent No.: US 10,013,643 B2
(45) Date of Patent: Jul. 3, 2018

(54) PERFORMING OPTICAL CHARACTER RECOGNITION USING SPATIAL INFORMATION OF REGIONS WITHIN A STRUCTURED DOCUMENT (71) Applicant: INTUIT INC., Mountain View, CA (US)

(72) Inventors: Vijay Yellapragada, Mountain View, CA (US); Peijun Chiang, Mountain View, CA (US); Sreeneel K. Maddika, Mountain View, CA (US)

(73) Assignee: INTUIT INC., Mountain View, CA (US)

(*) Notice: Subject to any disclaimer, the term of this patent is extended or adjusted under 35 U.S.C. 154(b) by 14 days.

(21) Appl. No.: 15/219,888

(22) Filed: Jul. 26, 2016

(65) Prior Publication Data
US 2018/0032842 A1 Feb. 1, 2018

(51) Int. Cl.
G06K 9/00 (2006.01)
G06K 9/62 (2006.01)
G06T 7/00 (2017.01)

(52) U.S. Cl.
CPC ....... *G06K 9/6267* (2013.01); *G06K 9/00442* (2013.01); *G06T 7/0081* (2013.01); *G06T 2207/20081* (2013.01); *G06T 2207/30176* (2013.01)

(58) Field of Classification Search
CPC ............... G06T 2207/30176; G06K 9/00442
See application file for complete search history.

(56) References Cited

U.S. PATENT DOCUMENTS

| 5,293,429 | A | * | 3/1994 | Pizano | G06K 9/00442 382/202 |
| 5,689,620 | A | * | 11/1997 | Kopec | G06K 9/6256 382/157 |
| 6,456,738 | B1 | * | 9/2002 | Tsukasa | G06K 9/00442 382/175 |
| 9,384,264 | B1 | | 7/2016 | Kavas | |
| 9,418,315 | B1 | * | 8/2016 | Keogh | G06K 9/6232 |

(Continued)

OTHER PUBLICATIONS

Rusinol Marcal et al; "Field Extraction from Administrative Documents by Incremental Structural Templates" 2013 12th International Conference on Document Analysis and Recognition, IEEE, Aug. 25, 2013, pp. 1100-1104, XP032502710.

(Continued)

*Primary Examiner* — John Strege
(74) *Attorney, Agent, or Firm* — Patterson + Sheridan, LLP (57) ABSTRACT Techniques are disclosed for facilitating optical character recognition (OCR) by identifying one or more regions in an electronic document to perform the OCR. For example a method for identifying information in an electronic document includes obtaining a set of training documents for each template of a plurality of templates for the electronic document, extracting spatial attributes for at least a first label region and at least a first corresponding value region from the set, and training a classifier model based on the extracted spatial attributes, wherein the classifier model is used to identify the information in the electronic document. The spatial attributes represent a position of at least the first label region and at least the first value region within the electronic document.

7 Claims, 7 Drawing Sheets (56) References Cited

U.S. PATENT DOCUMENTS

| | | | | |
|---|---|---|---|---|
| 9,576,196 B1* | 2/2017 | Natarajan | ............ | G06K 9/3258 |
| 2001/0042083 A1* | 11/2001 | Saito | ................ | G06F 17/30253 |
| | | | | 715/202 |
| 2009/0110288 A1* | 4/2009 | Fujiwara | ............ | G06K 9/00463 |
| | | | | 382/190 |
| 2009/0316986 A1* | 12/2009 | Hua | ................... | G06K 9/4647 |
| | | | | 382/170 |
| 2011/0258195 A1* | 10/2011 | Welling | ............ | G06K 9/00442 |
| | | | | 707/740 |
| 2013/0287284 A1* | 10/2013 | Nepomniachtchi | | |
| | | | ..................... | G06K 9/00442 |
| | | | | 382/139 |
| 2013/0294697 A1* | 11/2013 | Nepomniachtchi | .. | G06K 9/6211 |
| | | | | 382/192 |
| 2014/0241631 A1 | 8/2014 | Huang et al. | | |
| 2016/0300310 A1* | 10/2016 | Costanz | ................ | G06Q 20/18 |
| 2016/0321499 A1* | 11/2016 | Meier | ................. | G06N 99/005 |

OTHER PUBLICATIONS

Heroux P et al; "Classification method study for automatic form class identification", Pattern Recognition, 1998. Proceedings. Fourteenth International Conference on Brisbane, QLD., Australia Aug. 16-20, 1998, vol. 1, Aug. 16, 1998, pp. 926-928, XP010297599.

Oronzo Altamura et al; "Transforming paper documents into XML format with WISDOM++", International Journal on Document Analysis and Recognition., vol. 4, No. 1, Aug. 2001 (Aug. 2001), pp. 2-17, XP55388965.

International Search Report and Written Opinion dated Jul. 14, 2017 for Application No. PCT/US2017/030671.

* cited by examiner

PERFORMING OPTICAL CHARACTER RECOGNITION USING SPATIAL INFORMATION OF REGIONS WITHIN A STRUCTURED DOCUMENT

FIELD

The present disclosure relates to techniques for extracting data from documents. More specifically, the present disclosure relates to techniques for facilitating optical character recognition (OCR) by identifying one or more regions in an electronic document to perform the OCR.

BACKGROUND

Data processing and exchange are essential for a variety of businesses and personal transactions. For example, small businesses use accounting and inventory data to obtain and share reports regarding inventory sales, customer invoices, or cash flow. Similarly, healthcare providers examine medical records to view patient information related to insurance providers, medical conditions, or office visits.

In addition, data exchange frequently relies on document exchange including electronic versions of documents such as word-processing documents, spreadsheets, or Portable Document Format (PDF) documents and paper documents (e.g., which may be generated electronically). For example, a business may manage business transactions with a set of customers by creating a set of bills, invoices, or other types of documents containing data associated with the business transactions and sending the documents to the respective customers. The customers use the data in the documents to pay the bills or invoices, respond to the business, or update their records of the transactions. Similarly, companies, banks and mortgage companies may provide several tax documents (e.g., W-2, 1099-Int, etc.) to employees and customers as needed to file their tax returns, for example, by using commercially available income tax preparation software.

However, variations in the layouts or designs of documents may preclude efficient extraction and/or transfer of data from the documents. For example, a customer may receive bills, invoices or other semi-structured documents from a variety of businesses. While the documents may include many of the same types of data, locations of the data on a given document (e.g., form) often vary across documents from different sources. As a result, a computing device performing optical character recognition on an electronic version of the document may have difficulty extracting information from a given document for use by other applications (e.g., tax preparation application). Instead, the recipient or document owner may have to manually enter data from the document into an application.

SUMMARY

One embodiment presented herein includes a computer-implemented method for identifying information in an electronic document. The method generally includes obtaining a set of training documents for each template of a plurality of templates for the electronic document, extracting spatial attributes for at least a first label region and at least a first corresponding value region from the set, the spatial attributes representing a position of at least the first label region and at least the first value region within the electronic document, and training a classifier model based on the extracted spatial attributes, wherein the classifier model is used to identify the information in the electronic document.

DETAILED DESCRIPTION

Embodiments presented herein provide techniques for evaluating a document to identify regions of that document to perform OCR. For example, many traditional OCR techniques do not work well on structured or semi-structured documents (e.g., forms, documents arranged in a grid format, etc.), such as tax documents (e.g., W2, W4, etc.). In particular, traditional OCR techniques are often unable to distinguish between a label (e.g., the text label "NAME") in a document and a value (e.g., the actual name of a person entered into the form) associated with the label. Aspects of the present disclosure discuss techniques for identifying at least labels in a document based on a trained classifier model without the need to perform OCR, thus eliminating the need to distinguish between labels and values in the document as part of performing the OCR. In an aspect, once the labels are identified, OCR is performed on value regions (e.g., regions not identified as labels) to determine values corresponding to the identified labels. The discussed aspects include a technique to train the classifier model based on spatial information including positions of label and value regions within training images of the document that are extracted from known templates of the document.

In some cases, data may be included in a document such as a word-processing document, spreadsheet, Portable Document Format (PDF) document, web page, paper document or another type of formatted document containing semi-structured data. For example, the document may be a bill, invoice, form, statement, transcript, record, receipt, tax document (e.g., W-2, 1099-Int, 1099-Dive, consolidated brokerage statement, 1040, 1040A, 1040EZ, Schedule A, Schedule C), or other type of document that includes a specific type or set of data without adhering to a strict layout or format for showing the data.

The lack of common design, layout, or format between such documents may prevent efficient extraction or transfer of data from the documents to an application (e.g., tax preparation application) used to process or manage the data. For example, OCR engines are designed to be general purpose text-extraction systems and perform well on documents in which text is linearly laid out horizontally and vertically. OCR engines generally employ simple segmentation techniques to identify text blobs in a document. These techniques do not perform as well for structured/semi-structured documents, for example, tax documents. This may result in sub-par OCR results. Custom development of data-extraction code may be unfeasible for a large number of documents that frequently vary in design or layout. Thus, instead, users of the documents may be involved in a tedious, time-consuming, or error-prone process of manually entering data from the documents into the application before using the data with the application.

For example, existing income-tax preparation software typically collect income-tax information directly or indirectly from users. For example, a user may provide the income-tax information from forms (such as a W-2 form) by typing it in manually. Alternatively, the user may provide credential information (such as a user name and password) that allows the income-tax information to be downloaded from a payroll company's server. However, this indirect collection technique is not available for many users.

Manually providing income-tax information is a time-consuming and laborious process. Furthermore, because users don't know which data on a given form is relevant, they often provide all the information on the form, which results in wasted effort. In addition, manually provided income-tax information often contains errors that may cause mistakes in income-tax returns. However, requiring users to validate all of the data they have provided (such as all of the fields in a W-2 form) is also a time-consuming and laborious process, and the user may not detect all of the errors.

Furthermore, easy access to portable computing devices (e.g., smart phones) and plentiful network bandwidth have made portable computing devices very popular for sharing and processing data. For instance, users may easily download and execute a range of applications on their portable computing devices such as tablets and smartphones to process and share data. Factors such as larger screen sizes, increased computational capabilities, and inherent portability and convenience have made such devices the favorite computing platform of many users.

However, compact mobile devices also often have a number of limitations. Portability often comes at the expense of dedicated input mechanisms (e.g., replacing a full-size keyboard with a small virtual touch-screen keyboard), which can make data entry difficult. For example, manually inputting financial data into a smartphone can be a slow, frustrating, and error-prone process.

Aspects of the present disclosure discuss techniques to efficiently and accurately extract data from semi-structured documents (e.g., tax forms). Further, some of the aspects presented herein may advantageously be designed to run on resource-constrained environments, such as mobile devices, which have limited memory and processing power. In particular, some of the embodiments presented herein may utilize little memory and processing power to identify labels in a document, and further to identify value regions in the document for performing OCR to determine values corresponding to the identified labels.

In certain aspects, a computing device may be configured to generate a classifier model for use in extraction of information (e.g., labels and values) from documents. In particular, the computing device may obtain electronic (also referred to as "digital") images of the documents. The documents may correspond to different semi-structured documents, e.g., tax forms. For example, different companies may use different templates for a W2 form. The computing device may obtain electronic images of several different W2 forms corresponding to several different known templates. The electronic images may correspond to electronic versions of the documents (e.g., PDF or Microsoft Word formats), or may correspond to captured images of a physical document that are captured using an image capturing device, such as a camera phone, video camera, digital camera, digital scanner, etc., that is connected to or implemented in the computing device, or separate from the computing device.

In certain aspects, the computing device may extract spatial information associated with each template of the document (e.g. each W2 template) based on the electronic images of the documents. In certain aspects, the spatial information includes location and size information of one or more regions within the document template including labels and corresponding values. The computing device may train a machine learning classifier model based on the extracted spatial information.

In certain aspects, a computing device may be configured to extract information from a candidate document by using a trained classifier model as discussed above. For example, the computing device may obtain an electronic image of the candidate document, whose information needs to be extracted. The computing device performs segmentation of the image to obtain spatial information associated with the candidate document, for example, including location and size of regions within the document image that potentially include labels and/or values. The computing device identifies one or more labels and locates them within the candidate document based on the trained classifier model. OCR may be performed in regions of the candidate document not identified as labels to determine one or more values corresponding to the identified labels.

It may be noted that classic machine-learning approach generally includes training a classifier model based on pixel data associated with training images. This approach generally generates a huge training model binary. While this approach may work well for a generic image-classification problem, and may work well on large server farm, it may not work well in resource constrained environments, such as mobile devices, which have limited memory and processing resources. The techniques discussed in accordance with aspects of the present disclosure include training a classifier model based on spatial information (e.g., location and size information) of labels as compared to pixel data of the training images. In an aspect, this greatly reduces the size of the training model while still not compromising on the accuracy of classification, thus making it ideal for resource-constrained environments such as mobile devices.

Different aspects of these techniques are described in more detail herein, along with additional examples of how the techniques may be used to perform OCR by identifying at least labels and distinguishing between labels and values within a candidate document.

Figure 1:
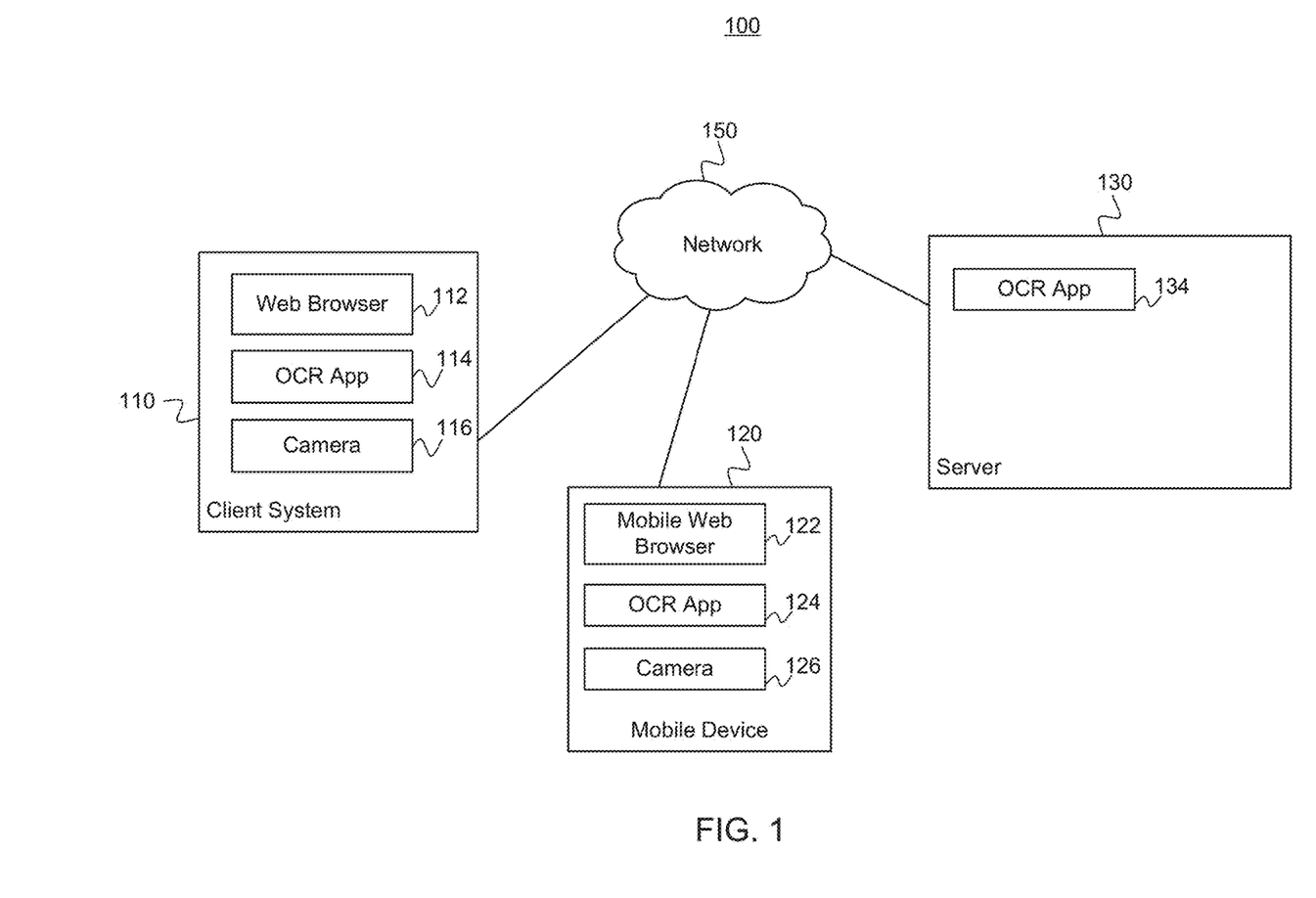
FIG. 1 illustrates an example of a computing environment used to perform OCR on a document, in accordance with certain aspects of the present disclosure.

FIG. 1 illustrates an example of a computing environment 100 used to perform OCR on a document, in accordance with certain aspects of the present disclosure. As shown, the computing environment 100 includes client system 110, a mobile device 120, and a server 130, which are each connected to a network 150. The network 150, in general, may be a wide area network (WAN), local area network (LAN), wireless LAN (WLAN), personal area network (PAN), a cellular network, etc. In a particular embodiment, the network 150 is the Internet.

Client system 110 is included to be representative of a general purpose computing system, such as a desktop or laptop computer hosting software applications that may be installed and run locally, or may be used to access applications running on the server 130. For example, client system 110 includes web browser 112 used to access the server 130 by rendering web pages (e.g., generated by the OCR app 134) from or running applications (e.g., OCR app 134) on the server 130. Similarly, client system 110 includes an OCR app 114. The OCR app 114 may be a local application that is installed and run locally on the client system 110. In certain aspects, the OCR app 114 may be representative of a component of a client server application (or other distributed application) which can communicate with the server 130 over network 150. For example, OCR app 114 may be a "thin" client where the processing is largely directed by the OCR app 114, but performed by computing systems of the server 130 or a conventional software application installed on client system 110. The client system 110 may further include a camera 116 for capturing images. The client system 110 may also include other devices that may be used for image capturing, for example, a scanner (not shown).

Mobile device 120 is included to be representative of a variety of computing devices, such as a mobile telephone or computing tablet. As shown, the mobile device 120 may access the server 130 over network 150 using a mobile web browser 122 or local application or "app" (e.g., OCR app 124) executed on the mobile device 120. In certain aspects, the OCR app 124 may be a local application that is installed and run locally on the mobile device 120. The mobile device 120 may further include a camera 126 (e.g., front-facing camera, rear facing camera, etc.) for capturing images. The mobile device 120 may also include other devices that may be used for image capturing, for example, a scanner (not shown).

As shown, the server 130 includes an OCR app 134 that may run locally on the server 130. Further, the OCR app 134 may be accessed and executed by devices on the network 150, such as the client system 110 or the mobile device 120. The OCR app 134, for example, may generate web pages that are rendered by a browser such as browser 112 or 122. In another example, OCR app 134 may be accessed by or work along with client side applications, such as OCR app 114 or 124, as discussed.

In certain aspects, one of the OCR apps 134, 114, and 124, or a combination thereof may be used to implement the techniques for facilitating identifying information in a document in accordance with aspects of the present disclosure. For example, OCR app 134 may perform an offline process including obtaining a set of training documents for each known template of a particular document (e.g., W2 document), extracting (automatically, semi-automatically, or by accepting manual input) spatial information (e.g., spatial attributes) for the document including positions of regions within the document encompassing labels and values, and training a machine learning classifier model using the extracted spatial attributes as training data. OCR app 144 or OCR app 124 may perform a run-time process including obtaining an image of a candidate document, segmenting the image to obtain regions (e.g., identified by spatial information of the obtained regions) within the image encompassing candidate labels and values, classifying and locating labels in the image based on the classifier model trained in the offline process, and performing OCR in the regions not identified as labels to obtain values corresponding to the identified labels. In an aspect, the mobile device 120 receives the trained classifier model from the server 130.

In certain aspects, the image of the candidate document may be obtained by capturing the image of the document using the camera 116 of the client system 110 or the camera 126 of the mobile device 120, or other image capturing mechanisms available at the client system 110 and the mobile device 120. In an aspect, the image of the candidate document may include an electronic version of the candidate document (e.g., in PDF format, Microsoft Word format etc.) In certain aspects, the offline processing and run time processing may be performed independently by each of the OCR apps 114, 124, and 134 or may be distributed over the OCR apps. In certain aspects, OCR app 134 may obtain the set of training images for the offline processing from production images stored locally at the server or received from the client system 110 or mobile device 120. For example, one or more of the production images may be captured by an operator of the client system 110 or mobile device 120 using their respective cameras 116 or 126, and may be sent to the server 130. In an aspect, production images include electronic versions of one or more documents (e.g., in PDF format, Microsoft Word format etc.). In certain aspects, the candidate image may be captured at the client system 110 or mobile device 120 and may be sent to the server 130 for run-time processing by OCR app 134, for example, in order to take advantage of relatively faster processing speeds at the server 130. The results of the run-time process (e.g., labels and corresponding values identified in the document) may be sent back to the client system 110 or mobile device 120, for example, for use by one or more applications at these devices (e.g., tax preparation application).

Figure 2:
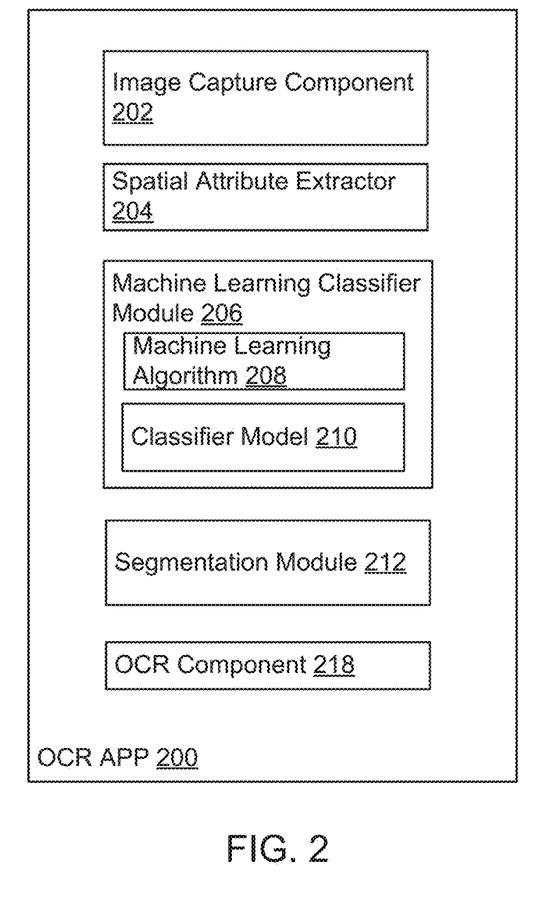
FIG. 2 illustrates an OCR app, in accordance with certain aspects of the present disclosure.

FIG. 2 illustrates an OCR app 200 (e.g. OCR apps 114, 124, and 134 or combination thereof), in accordance with certain aspects of the present disclosure. As shown in FIG. 2, OCR app 200 includes an image capture component 202, a spatial attribute extractor 204, a machine learning classifier model 206, a segmentation module 212, and an OCR module 218. The machine learning classifier module 206 further includes a machine learning algorithm 208 and a classifier model 210. Image capture component 202 controls an image capture device (e.g., camera 116 or 126) to obtain image of a document. Spatial attribute extractor 204 extracts spatial information including location and size information of labels and value regions associated with document images. The document images may include a training image used for training the classifier model 210 or a candidate image captured for extraction of information. The segmentation module 212 segments candidate images to obtain spatial information associated with regions within the image encompassing potential labels and values. The machine learning classifier module 206 includes a machine learning algorithm that trains the classifier model based on spatial information obtained for a set of training images by the spatial attribute extractor 204. The machine learning classifier module 206 further identifies and locates labels within a candidate document by running the spatial information obtained for the candidate document image by the segmentation module 212 through the classifier model 210. OCR component 218 performs OCR on regions of the candidate document image not identified as labels to obtain values corresponding to the identified labels.

Figure 3:
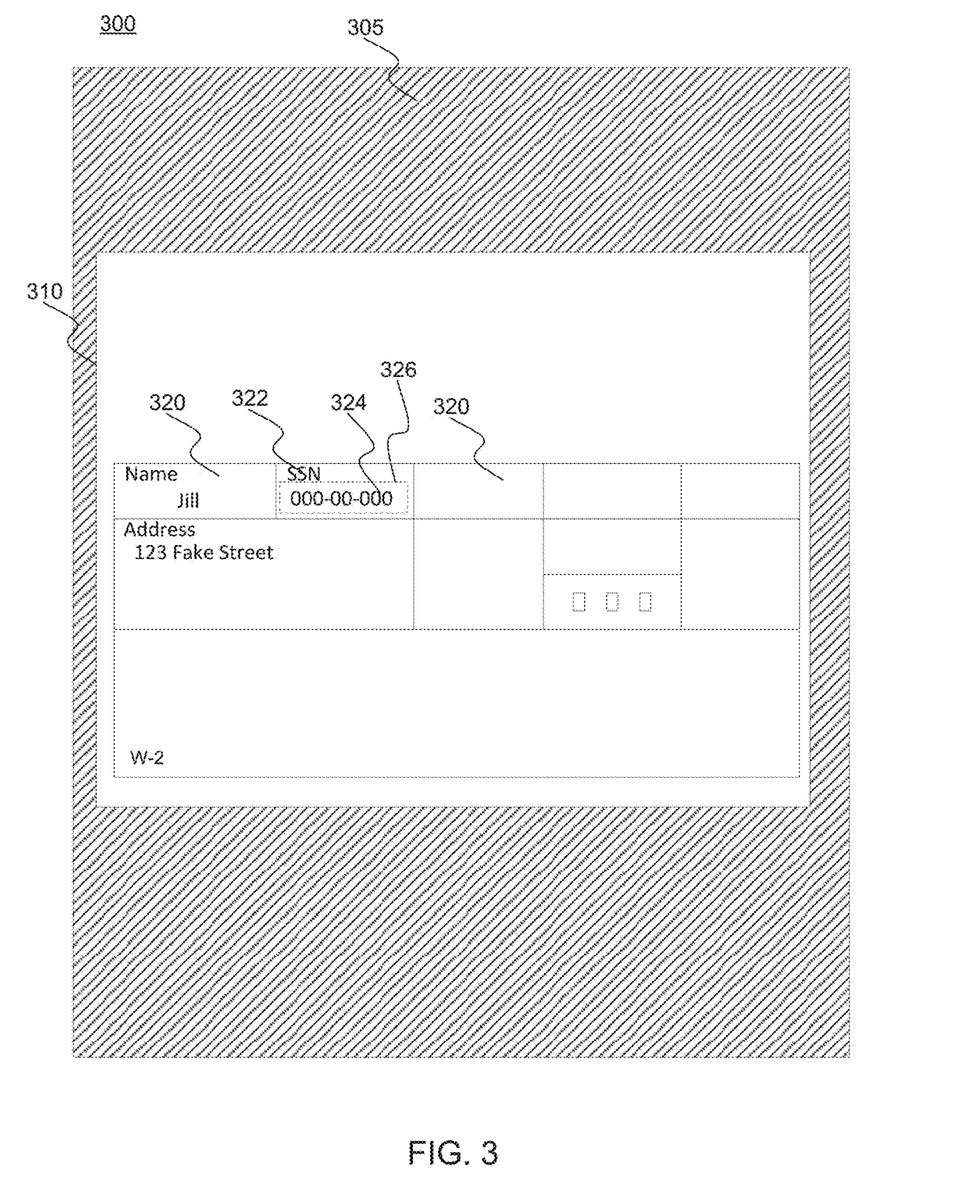
FIG. 3 illustrates an example image which depicts a document, in accordance with certain aspects of the present disclosure.

FIG. 3 illustrates an example image 300 including a document 310, in accordance with certain aspects of the present disclosure. In the embodiment shown, the electronic image 300 includes the document 310 in a portion of the electronic image 300, as well as other background imagery 305. For example, the electronic image 300, as shown, may correspond to an image of the document 310 captured using an image capture device (e.g., camera of a mobile device) and include the background imagery 305. However, in some other embodiments, the electronic image 300 may not include any background imagery 305 (e.g., the electronic image 300 corresponds to an electronic version of a document).

The document 310, as shown, may be a form (e.g., tax form such as a W2). The document 310 includes a number of elements 320 (e.g., grid elements, boxes, rectangles, etc.). The elements 320 may correspond to areas on the document 210 where textual information may be found. For example, an element 320 may include a label 322 (e.g., text label), which may indicate the type of data (e.g., social security number (SSN)) that is within the element 320. The element 320 may further include a value 324 (e.g., text), which may be the actual value of the textual information (e.g., SSN) included in the element. The value 324 may be found within a region 326 (e.g., a text entry area) within the element 320 designated as the location for the value 324. Embodiments herein may provide techniques to identify such regions 326 within a document 310 via segmentation, identifying at least labels (e.g., label 322) of the document 310 based on a trained classifier model, and performing OCR on regions 326 that are not identified as labels to obtain values (e.g., value 324).

Figure 4:
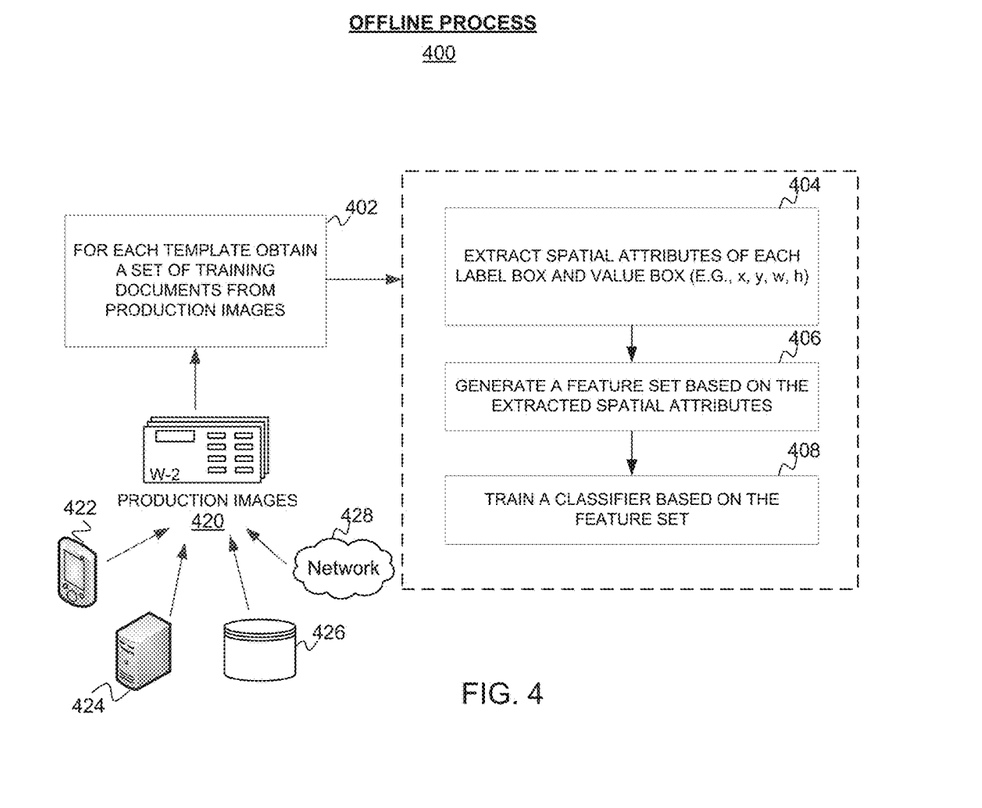
FIG. 4 illustrates example operations performed as part of an offline process used for identifying information in a document, in accordance with certain aspects of the present disclosure.

FIG. 4 illustrates example operations 400 performed as part of an offline process used for identifying information in a document, in accordance with certain aspects of the present disclosure. Operations 400 beings, at 402 by obtaining, for each template of the document a set of training images. In an aspect, the document is a semi-structured document such as a W2 tax document. In an aspect, the training images are selected from a pool of production images 420 including training images corresponding to several templates for each of a plurality of documents. In certain aspects, the pool of production images 420 may be constructed by obtaining production images from multiple sources. For example, as shown in FIG. 4, production images may be obtained from an end user device (e.g., mobile device 422), which, for example are captured using an image capturing device or available as electronic versions. Similarly, the production images may be obtained from a server 424, a local storage 426 or over a network 428 (e.g., stored in a cloud).

At 404, spatial information associated with each document template is extracted based on the training images. In an aspect, this extraction of spatial information may be performed manually, semi-automatically, or automatically. In an aspect, manual extraction of the spatial information includes prompting the user to select regions of a training image and to tag the selected region as labels or values. Further, the user may be prompted to identify each of the regions tagged as labels. For example, a user may drag a mouse pointed on a training image to draw a rectangular box around a label "employee name", and may tag the selected box as a label. The user may further specify that the label corresponds to "employee name". In an aspect, semi-automatic extraction of spatial information may include automatically identifying boxes within a training document having text (e.g., by identifying borders associated with boxes having text using image recognition techniques) and prompting the user to manually tag the identified boxes as labels or values, and further identify the labels. In an aspect, automatic extraction of the spatial information includes automatically identifying boxes within a training document having text (e.g., by identifying borders associated with boxes having text using image recognition techniques), and automatically tagging the boxes as labels and values and identifying the labels based on already available spatial information associated with the training document.

In certain aspects, the spatial information may include spatial attributes for each of the identified label and value regions of the training document. In an aspect, the spatial attributes include at least one of dimensions of each label region and value region (e.g., width 'w' and height 'h' of label and value boxes), position of each label region and value region within the electronic document (e.g., horizontal and vertical coordinates "x and y"), or position of each label region and value region relative to other label and value regions in the training image, and/or relative to each other.

In an aspect, the spatial information extracted for each document template is stored as metadata, for example, locally at a device performing the operations 400 or remotely (e.g., at a server).

At 406, a feature set is generated including the extracted spatial attributes. At 408, a machine learning classifier model is trained using the generated feature set to generate a trained classifier model. In an aspect, the trained classifier is used in a run-time process for classifying and locating at least labels in candidate documents.

Figure 5:
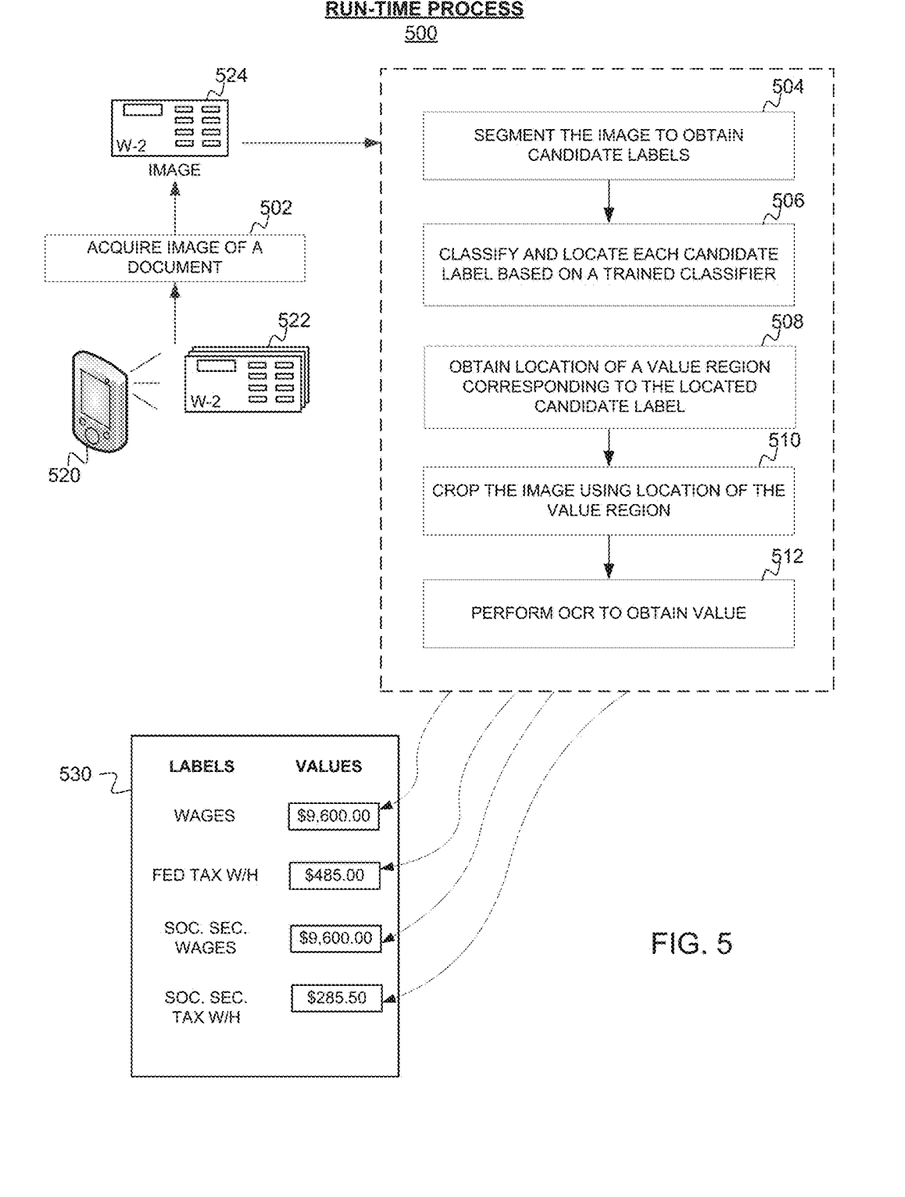
FIG. 5 illustrates example operations performed as part of a run-time process used for identifying information in a document, in accordance with certain aspects of the present disclosure.

FIG. 5 illustrates example operations 500 performed as part of a run-time process used for identifying information in a document, in accordance with certain aspects of the present disclosure. At 502, an image 524 of a candidate document is obtained. In an aspect, the candidate document is a semi-structured document such as a W2 tax document. In an aspect, the image 524 is captured using a camera of a mobile device (e.g. mobile device 520). In an aspect, a user may capture multiple images of the candidate document and may manually select the image 524 from the multiple captured images for further processing. At 504, a segmentation algorithm may be run for the image 524 to obtain candidate labels, the candidate labels including regions within the image 524 that may potentially include a label. In an aspect, obtaining the candidate labels includes obtaining spatial information (e.g., spatial attributes) of the regions.

In certain aspects, the segmentation algorithm may include several processing steps including, but not limited to, scaling the image 524 down to a smaller size (e.g. 8×8, 16×16, etc.) to achieve better performance, gray scaling the image 524, applying a morphological gradient operation, applying binarization including setting each pixel of the image 524 to one of two values (e.g., 0 or 1) to generate a bi-tonal image, removing horizontal and vertical lines from the image 524, connecting horizontally oriented regions of the image 524, run findContours operation, and filtering contours to throw away extremal contours. Each of these processing operations is known in the art and will not be described herein. At this point, the system does not know which of the identified regions correspond to labels and which ones correspond to values.

At 506, each candidate label is classified (e.g., identified) and located within the candidate document based on the trained classifier generated during the offline processing (e.g., process block 408 of FIG. 4). For example, each region of the image 524 identified in step 504 as potentially containing a label is run through the trained classifier model. In an aspect, one or more of the regions are identified and located within the candidate document as a result of the classification operation. At 508, locations of one or more value regions corresponding to each identified label are obtained. For example, each of the regions not identified as a label during the classification step at 506 may be designated as a value region. Further, a designated value region may be identified as corresponding to an identified label based on the position of the value region relative to the label and other labels and value regions. The identification of correspondence between value regions and labels may be carried out based on meta data including spatial information stored during the offline process (e.g., step 404 of FIG. 4).

At 510, the image is cropped based on the obtained locations of the value regions. At 512 OCR is performed in the cropped images to obtain values within the value regions. In an aspect, the identified labels and corresponding obtained values may be used for further processing of data by one or more applications at a device. For example, the identified labels and values of a candidate W2 tax document may be used to populate labels and value fields in an interface 530 of a tax preparation application at a mobile device.

Figure 6:
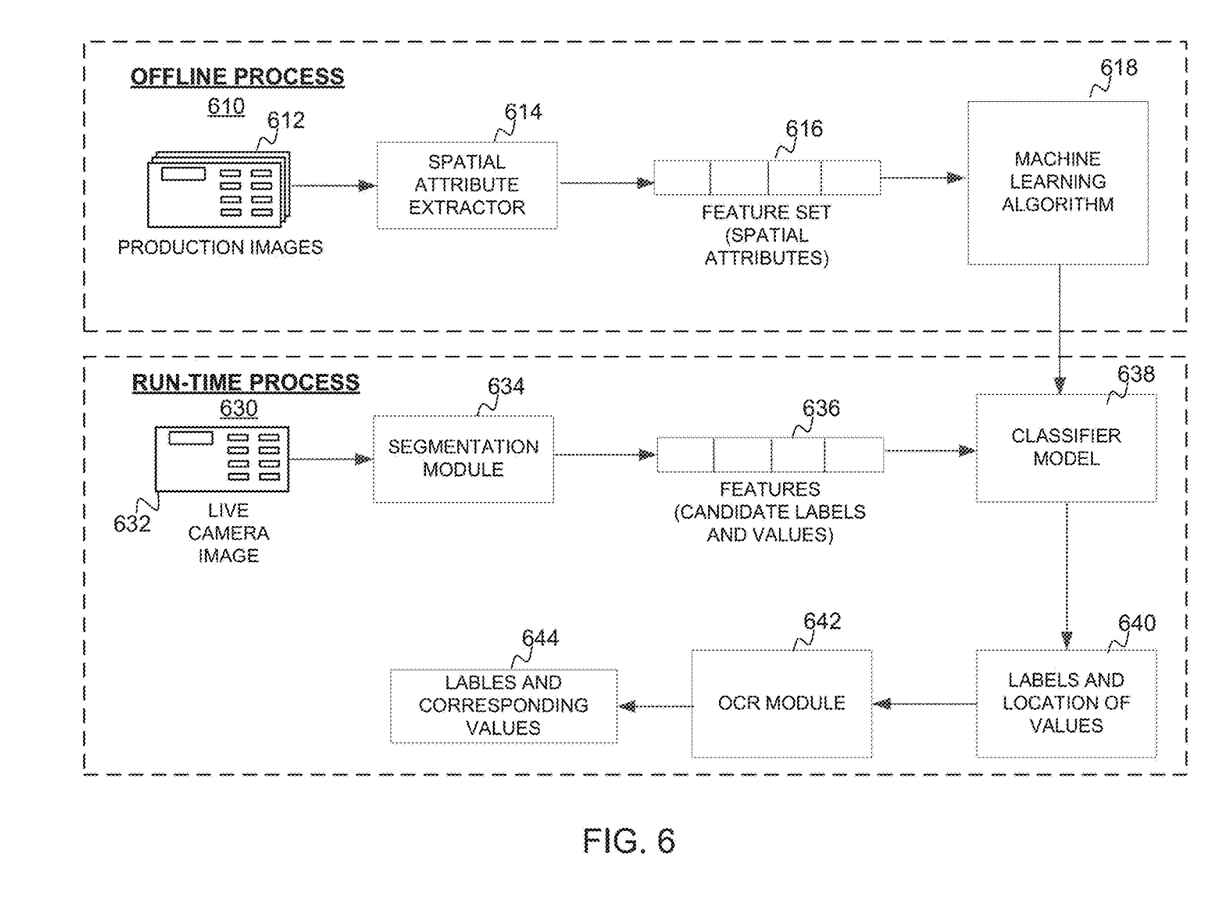
FIG. 6 illustrates a block diagram showing a data flow for an offline process and a run-time process for extraction of information from a document, in accordance with certain aspects of the present disclosure.

FIG. 6 illustrates a block diagram 600 showing a data flow via an offline process and a run-time process for extraction of information from a document, in accordance with certain aspects of the present disclosure.

Offline process 610 starts by obtaining production images 612 and obtaining a set of training images for each template of a document (e.g., W2 tax document) from the production images 612. The spatial attribute extractor 614 extracts spatial information corresponding to one or more regions within a training image. As discussed before, each of the identified regions are tagged as labels or values. A feature set including the extracted spatial attributes is fed to a machine learning algorithm 618, which trains a classifier model 638 based on the spatial attributes extracted for the training images.

The run-time process starts by obtaining a candidate image of a candidate document (e.g., W2 tax document). As discussed before, the image of the candidate document may be obtained by capturing the image using an image capturing device, for example, at a mobile device. The segmentation module identifies a plurality of regions within the candidate image that potentially include candidate labels. Spatial information (e.g., spatial attributes corresponding to of the candidate labels are fed to the classifier model, which identifies one or more of candidate labels as labels and locates these labels within the candidate image. The classifier model outputs 640 the identified labels and value regions (e.g., regions not identified as labels). An OCR module 642 performs OCR on the value regions to obtain 644 one or more values corresponding to the identified labels.

Figure 7:
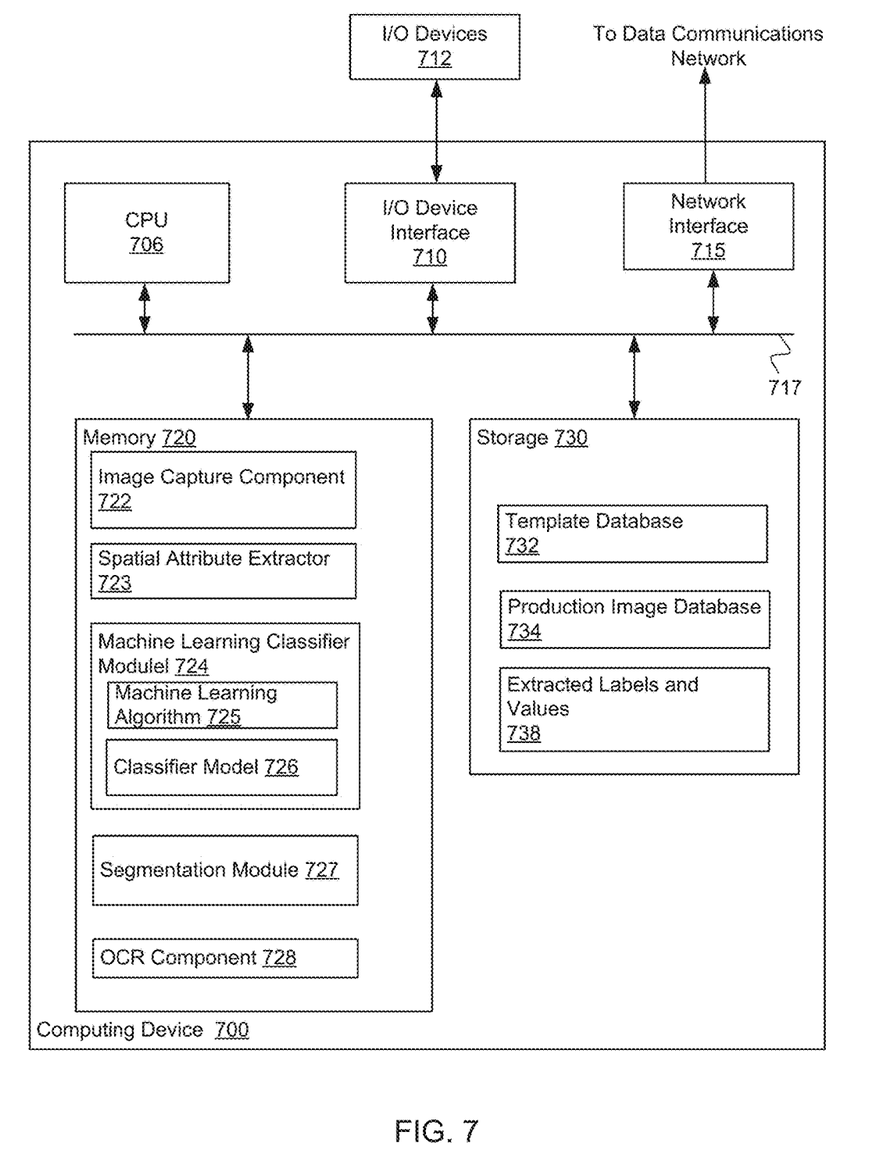
FIG. 7 illustrates an example computing system used to identify information in a document, in accordance with certain aspects of the present disclosure.

FIG. 7 illustrates an example computing system 700 used to identify information in a document, in accordance with certain aspects of the present disclosure. As shown, the computing system 700 includes, without limitation, a central processing unit (CPU) 706, a network interface 715, a memory 720, and storage 730, each connected to a bus 717. The computing system 700 may also include an I/O device interface 710 connecting I/O devices 712 (e.g., keyboard, display, mouse devices, image capture devices, etc.) to the computing system 700. Further, the computing elements shown in computing system 700 may correspond to a physical computing system (e.g., a system in a data center) or may be a virtual computing instance executing within a computing cloud.

The CPU 706 retrieves and executes programming instructions stored in the memory 720 as well as stored in the storage 730. The bus 717 is used to transmit programming instructions and application data between the CPU 706, I/O device interface 710, storage 730, network interface 715, and memory 720. Note, CPU 706 is included to be representative of a single CPU, multiple CPUs, a single CPU having multiple processing cores, and the like, and the memory 720 is generally included to be representative of a random access memory. The storage 730 may be a disk drive or flash storage device. Although shown as a single unit, the storage 730 may be a combination of fixed and/or removable storage devices, such as fixed disc drives, removable memory cards, optical storage, network attached storage (NAS), or a storage area-network (SAN).

Illustratively, the memory 720 includes an image capture component 722, a spatial attribute extractor 723, a machine learning classifier module 724 including machine learning algorithm 725 and classifier model 726, a segmentation module 727 and an OCR component 728. In certain aspects, these components may correspond to the components of the OCR app 200 described with reference to FIG. 2.

For example, image capture component 722 controls an image capture device (e.g., camera 116 or 126 of FIG. 1) to obtain at least one image of a document. Spatial attribute extractor 723 extracts spatial information including location and size information of labels and value regions associated with document images. The document images may include training images used for training the classifier model 726 or a candidate image captured for extraction of information. The segmentation module 727 segments candidate images to obtain spatial information associated with regions within the image encompassing potential labels and values. The machine learning classifier module 724 includes a machine learning algorithm that trains the classifier model 726 based on spatial information obtained for a set of training images by the spatial attribute extractor 723. The machine learning classifier module 724 further identifies and locates labels within a candidate document by running the spatial information obtained for the candidate document image by the segmentation module 727 through the classifier model 726. OCR component 728 performs OCR on regions of the candidate document image not identified as labels to obtain values corresponding to the identified labels.

It may be noted that, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for identifying information in an electronic document, comprising:
   obtaining a set of training documents for each template of a plurality of templates for the electronic document;
   extracting a first set of spatial attributes for at least a first label region and at least a first corresponding value region from the set, the first set of spatial attributes representing a position of at least the first label region and at least the first value region within the electronic document;
   training a classifier model based on the extracted first set of spatial attributes to generate a trained classifier model;
   segmenting, an image of the electronic document to obtain a second set of spatial attributes of candidate regions in the image, each of the candidate regions corresponding to a label or a value;
   identifying at least one candidate region from the candidate regions as a label to generate an identified label based on the obtained second set of spatial attributes using the trained classifier model without performing Optical Character Recognition (OCR);
   designating at least one of the candidate regions that is not identified as a label, as a designated value region; and
   performing OCR only on the designated value region to obtain at least one value corresponding to the identified label.

2. The method of claim 1, wherein the information comprises at least one label and at least one corresponding value in the electronic document.

3. The method of claim 1, further comprising identifying the designated value region as corresponding to the identified label based on the classifier model.

4. The method of claim 3, wherein the designated value region is identified as corresponding to the identified label based at least on a position of the designated value region relative to the identified label.

5. The method of claim 1, further comprising obtaining the image of the electronic document by capturing the image using a camera device of a mobile device.

6. The method of claim 1, wherein the spatial attributes comprises at least one of dimensions of each of the at least one label region and the at least one corresponding value region, position of each of the at least one label region and the at least one corresponding value region within the electronic document, or position of the at least one label region and the at least one corresponding value region relative to other regions in the electronic document.

7. The method of claim 1, wherein the electronic document comprises a semi-structured document.

* * * * *